Patented Oct. 22, 1935

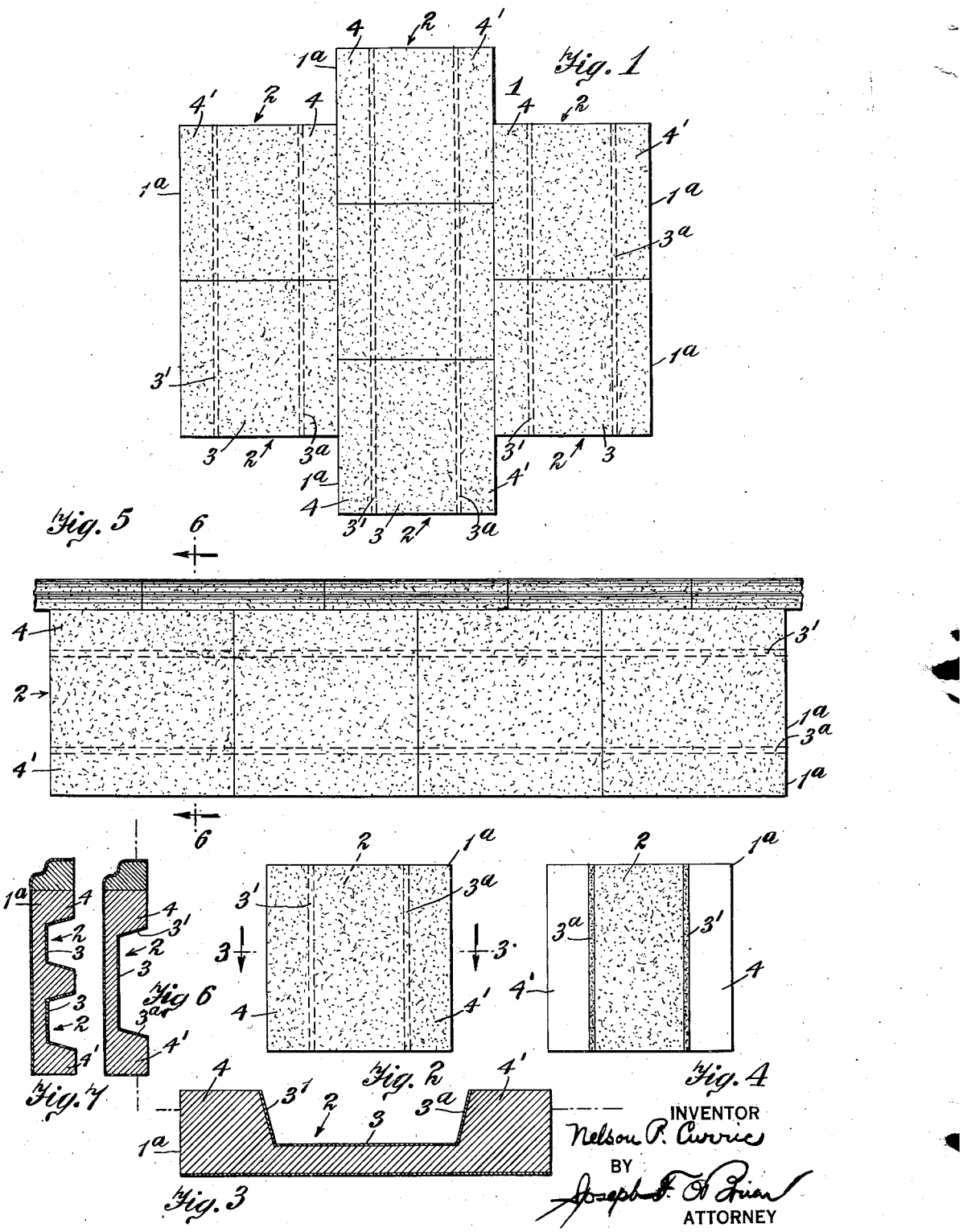

2,018,201

UNITED STATES PATENT OFFICE 2,018,201

WALL OR BASE TILE

Nelson P. Currie, West Newton, Mass., assignor to Mosaic Tile Company, Zanesville, Ohio, a corporation of Ohio Application December 20, 1932, Serial No. 648,053

3 Claims. (Cl. 72—18)

This invention relates to improvements in wall or base tiles.

Wall and base tiles are usually formed of baked clays of varying compositions or bodies, all of which are usually porous and water absorbent, and these tiles are provided on the outer surface thereof with a glaze to enable the production of a sanitary wall surface which will shed dust and dirt and can be readily washed or cleaned. The inner face and side edges of such a tile is unglazed and when the tile is embedded in concrete or other cementitious material, the porosity of said inner face and edges assist in the forming of tight joints with the cementitious material in which the tile is laid, mounted or embedded.

One of the objects of the present invention is to enable the utilization of wall and base tiles composed as aforesaid, of porous, water-absorbent baked clays to provide effective water-receiving conduits between the tile surface and the wall proper or cementitious laying material and particularly to provide open conduits between such tiles and the said cementitious surface which will effectively receive and conduct away any water which would otherwise pass into the body of the tile and thus finally discolor the tile surface of the wall, and to this end a conduit-forming depression is provided in each wall tile having a glazed surface or surfaces and when a series of these conduit forming depressions are properly positioned in a wall, they will enable a conduit to be formed which will provide for the conduction of water downwardly by gravity to a suitable drain or the like.

Tiles of this character are particularly useful for surfacing the walls of tunnels and other passages or rooms where water or leakage of water is likely to occur and in which it frequently happens that the leakage of water or moisture occurs, and my improved tile will thus prevent such water or moisture from passing into or through the tile to the outer glazed surface where, many times, discolorations of a large area of wall surface results, and where also at times water passes through the cracks in the tiles and causes moisture to appear on the outer surface of such walls.

In my present tile construction, it will be apparent that glazed-surface depression will provide in the wall below the surface conduits to carry the water downwardly by gravity and to prevent such water or moisture from passing through the body of the tiles or from being absorbed thereby and that such conduits will consequently prevent discoloration, bulging, loosening, etc., of the tile units on such wall surfaces.

Another object of my invention is to provide conduits in base tiles for the walls of rooms and the like which conduits will be suitable for the passing therethrough of telephone and electric wires, it being understood that this use of the glazed conduit-forming depression at the back of the tile will produce a conduit with smooth wall surfaces through which such electric and telephone wires may be strung and also will provide for such wires a conduit of high insulating value.

With these and other objects in view, the invention comprises the combination of members and arrangement of parts so combined as to co-act and co-operate with each other in the performance of the functions and the accomplishment of the results herein contemplated, and comprises in one of its adaptions the species or preferred form illustrated in the accompanying drawing, in which:—

Fig. 1 is a front elevation of a section of wall surfaced with tiles embodying my invention;

Fig. 2 is a front view of a single tile of the type shown in Fig. 1.

Fig. 3 is a section on the line 3—3 of Fig. 2 looking in the direction of the arrows;

Fig. 4 is a rear view of the tiles shown in Figs. 2 and 3;

Fig. 5 is a front elevation of a base member formed of tiles embodying my invention;

Fig. 6 is a section on the line 6—6 of Fig. 5 looking in the direction of the arrows;

Fig. 7 is a similar section of a modified tile.

Referring now to Figs. 1 to 4 of this drawing, which illustrate a preferred embodiment of my invention, 1 indicates a fragmentary section of wall composed of a plurality of tiles embodying my invention, and each provided with a conduit-forming depression 2. It will be seen from Fig. 1 that these tiles are so disposed on a wall surface that the conduit-forming depression 2 in one tile registers with similar depressions in other vertically-disposed tile units so as to provide continuous vertical conduits in the wall which are adapted to receive any moisture that would normally come through from the outer or concrete side of such wall into contact with the inner surface of the tile. Obviously, these conduits will conduct such water or moisture downwardly by gravity into a suitable drain or the like. It will be understood that wall tile units of the type hereinabove specified are particularly adapted for use on any walls that are likely to become wetted or to have moisture pass therethrough from the rear to the front side thereof, and they are therefore particularly useful in tunnels, and like structures in which it frequently happens that water leaks or seeps through from the back of the wall which often becomes cracked or otherwise impaired. Any such leakage of water or moisture which has heretofore reached the tile surface has been absorbed by the tile body or surfacing layer, thus very often causing the entire tile surface to become discolored and frequently causing a loosening of the tile from the wall.

By the use of my invention, a conduit-forming depression is provided in the body of each tile unit 1ª. This depression is, as shown, polygonal in conformation having the walls 3, 3' and 3ª glazed during the manufacture of the tile, and consequently these conduit walls are waterproofed and will conduct any moisture or water contacting therewith or which may leak through the cementitious foundation or laying material downwardly into a suitable drain pipe or the like.

In accordance with my invention, each wall tile unit is preferably provided with a thickened body to provide suitable depth for the conduit-forming depression 2, and is also provided at opposite sides of the depression with embedding portions 4—4' which are left unglazed and porous so as to provide more secure connection with the concrete or other cementitious wall surface on which the tile is laid or mounted.

It will be seen from the above that my improved tile performs the double function of a wall tile having a front surface with the sanitary and readily cleansible qualities inherent in the usual tile, and at the same time provides a moisture conducting conduit which will not only conduct away any moisture that may impinge or come into contact with the rear side of the tile, but will act to prevent any such moisture from discoloring the outer surface of the tile or from loosening these tiles; and will also provide an air space or conduit for the tile surface which will keep such tile-surface free of dampness as well as provide means for conducting away any water that may come in contact therewith, and furthermore, will prevent the tile itself from absorbing water from the wall and thus becoming loosened or peeling off and thus defeating the primary object of tiling a wall.

My improved wall conduits may in certain wall constructions such as tunnels or the like, merely conduct moisture or water downwardly to a suitable drain or to the earth, but if desired, such conduits may be connected with a horizontal conduit or a base member with a horizontal conduit either in tile base members such as shown in Figs. 5 and 6 or other drain members, it being understood that these horizontally disposed conduits if employed for drains will be so arranged as to conduct the surplus water in a downwardly inclined path to any suitable outlet or drain pipe.

In accordance with my invention, the base-member tile units may also be employed to provide conduits which will be suitable for the stringing of telephone, telegraph and electric wires in buildings and the like, and in such installations the conduit-forming depressions may be made into any suitable shape and may have one or a plurality of glazed surfaced compartments or conduits as shown in Figs. 6 and 7, so as to enable utilization of such conduits for high tension and low tension wires.

It will be understood that conduits of this character will provide insulation of high degree and that outlet boxes may be positioned at any suitable point along such conduits.

While I have shown a conduit-forming depression of polygonal conformation, it will be obvious that the conformation of this depression may be changed in any suitable manner which will permit ready manufacturing of the tile units under consideration and which will at the same time suit the purpose for which the tile is intended.

Having described my invention, I claim:—

1. A tile unit having a relatively thick substantially polygonal body composed of a relatively porous material, having a conduit-forming depressed portion extending centrally therethrough from one edge to another, said conduit-forming depressed portion being provided with a glazed surface, and said tile also having unglazed portions of greater thickness for embedding into a wall whereby a depression of suitable depth to form a conduit between said glazed portions and the wall is provided.

2. A tile unit composed of a porous ceramic material having in its inner face a conduit-forming depressed portion extending from one edge of said tile unit to another, said conduit-forming depressed portion being provided with a glazed surface and having, on opposite sides of said glazed depressed surface, portions provided with unglazed surfaces for bonding with a wall.

3. A wall having a tile-mounting surface and a plurality of tile units each having a conduit-forming depressed portion with a glazed surface extending from edge to edge thereof, and also having, on opposite sides of said glazed surface, portions provided with unglazed wall-bonding surfaces, said tile units being disposed with the said depressions in vertical registration and communicating with each other to produce wall conduits for conduction of water or moisture passing through the tile mounting surface.

NELSON P. CURRIE.